United States Patent [19]

Knorpp et al.

[11] 4,049,908
[45] Sept. 20, 1977

[54] METHOD AND APPARATUS FOR DIGITAL DATA TRANSMISSION

[75] Inventors: Eberhard Knorpp, Gauting, Germany; Silvian Schaffer, Dat-Yam, Israel

[73] Assignee: Siemens Aktiengesellschaft, Munich, Germany

[21] Appl. No.: 673,344

[22] Filed: Apr. 2, 1976

[30] Foreign Application Priority Data

Apr. 14, 1975 Germany .................................. 2516192

[51] Int. Cl.² .............................................. H04L 5/14
[52] U.S. Cl. .................................................. 178/58 R
[58] Field of Search ................. 179/18 FC, 170 NC; 178/50, 68, 58 R, 58 A, 23 R, 23 A; 343/178

[56] References Cited

U.S. PATENT DOCUMENTS

| 3,496,293 | 2/1970 | Avery et al. | 178/58 A |
| 3,668,328 | 6/1972 | Nakagome et al. | 178/58 R |
| 3,967,058 | 6/1976 | Moriya et al. | 178/58 R |

*Primary Examiner*—Thomas A. Robinson
*Attorney, Agent, or Firm*—Schuyler, Birch, Swindler, McKie & Beckett

[57] ABSTRACT

A method and apparatus for transmitting digital data between subscriber stations and a subscriber concentrator and using time hybrids are described. The two-wire lines connecting the subscriber stations to a concentrator are utilized on a four-wire basis, and operate on a time interleaved manner of actuating the send and receive modes of operation of the time hybrids. The send mode of the time hybrid at the subscriber concentrator is actuated responsive to a synchronizing pulse from the concentrator. The send mode of the time hybrid associated with the subscriber stations occurs upon acceptance of data over the two-wire line and a specific time relationship is established between the received data and the initiation of the send mode. In both types of time hybrids a receive pause occurs between the send mode and the subsequent receive mode, and the pause is of a duration corresponding to the anticipated maximum transit time over the two-wire line. In the time hybrids allocated to the subscriber stations a send pause is placed between receive mode and subsequent send mode which in its leading portions corresponds in time with the receive pause of the time hybrid in the concentrator.

3 Claims, 2 Drawing Figures

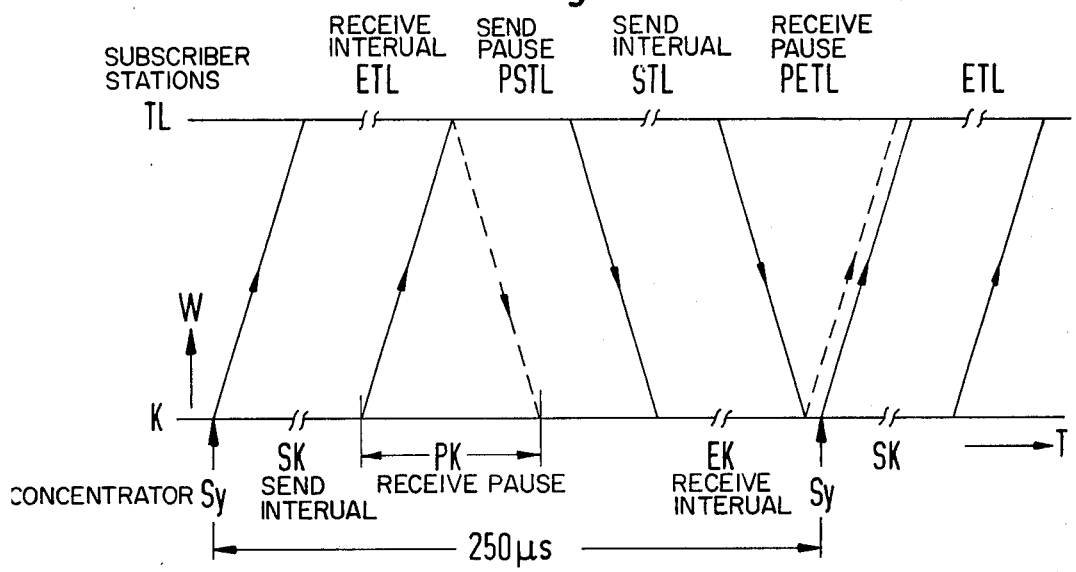
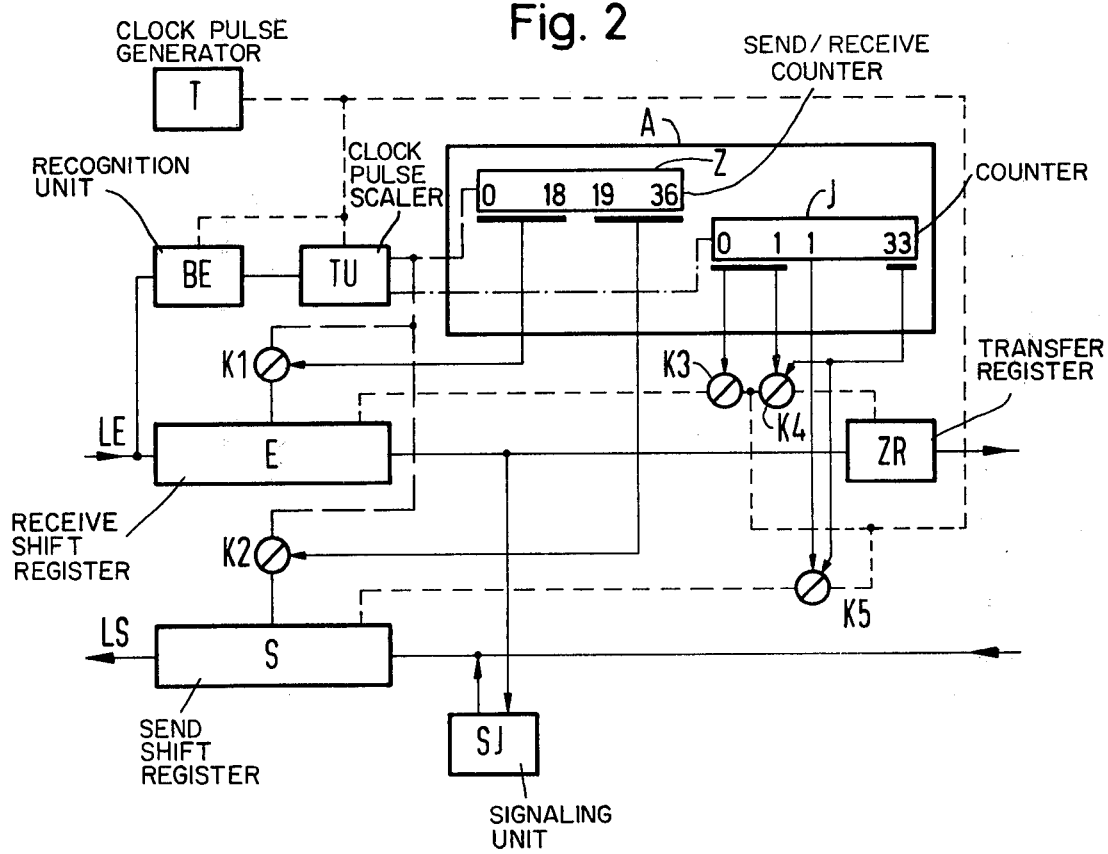

METHOD AND APPARATUS FOR DIGITAL DATA TRANSMISSION

BACKGROUND OF THE INVENTION

This invention relates to a method and apparatus for transmitting digital data between digitally operating subscriber stations and a subscriber concentrator of a time division multiplex (TDM) telecommunication network. In particular, the invention is concerned with such data transmission carried out via two-wire lines utilized on a four-wire basis through a time-interleaved arrangement of transmit and receive modes of a time hybrid circuit.

The digitalization of TDM telecommunication networks, insofar as subscriber stations are concerned, has, among other things, the advantage that subscriber concentrators can be designed more simply.

As a rule, four-wire lines are needed in TDM systems in which the data are transmitted in digital form. That means, however, that the above mentioned advantage of the digitalization of the subscriber stations is negated by an additional expenditure caused by the four-wire design of the subscriber lines connecting the subscriber stations to a subscriber concentrator.

For the information exchange between subscriber stations and the subscriber concentrator the use of two-wire lines has been disclosed in the prior art (West German patent application No. P 23 46 984.3-31), but in the prior art apparatus the subscriber stations do not operate digitally and are connected over time hybrid circuits to the subscriber concentrator. Due to the interleaving on a time-division basis of send and receive mode, time hybrid circuits are utilized on a four-wire basis.

It is an object of the invention to provide a means and method of operating such time hybrids which avoids interference with the data transmission by echo signals and interaction between the time hybrids allocated to the subscriber stations and those assigned to the concentrator.

SUMMARY OF THE INVENTION

In accordance with the invention, the foregoing and other objects are achieved in that the send mode of a time hybrid allocated to the subscriber concentrator is initiated by a synchronizing pulse generated in the concentrator. The send mode of a time hybrid allocated to a subscriber station is made dependent on the acceptance of data via the relevant two-wire line and is placed in a permanent time relationship thereto. In both types of time hybrids a receive pause is observed between send mode and subsequent receive mode corresponding to the maximum transit time to be expected during the transmission via a two-wire line. In the time hybrids assigned to a subscriber station a send pause is observed between receive mode and subsequent send mode which at its leading portion corresponds in time with the receive pause of the time hybrids in the concentrator.

Since in accordance with the principles of the invention the two types of time hybrids operate in a master-slave mode, with the time hybrid assigned to the subscriber concentrator operating in the master mode, interaction between the two types of time hybrids is avoided.

Due to the receive pause observed in both types of time hybrids between send and receive mode it is avoided that data transmitted to either type of time hybrid and reflected there are accepted again by the transmitting time hybrid. Due to the send pause provided between receive and send mode in the time hybrids allocated to the subscriber stations it is avoided that useful information transmitted to the hybrid allocated to the subscriber stations arrives during a receive pause of the hybrid assigned to the concentrator, and is thus rejected.

According to a further development of the invention, the digital data are transmitted as an information block in conjunction with a start bit and a signaling bit. The start bit of the information block transmitted from the concentrator to the subscriber station is utilized for initiating and synchronizing the send mode of the time hybrid allocated to the subscriber station. Since these start-of-block bits appear at comparatively short intervals, thus causing a frequent resynchronization in the time hybrids allocated to the subscriber stations, no great demands as to clock-pulse accuracy need be made on the clock-pulse generators associated with these time hybrids.

BRIEF DESCRIPTION OF THE DRAWINGS

The method and apparatus in accordance with the teachings of the invention will be more readily understood by reference to the following discussion with reference to the accompanying two figures of drawings.

FIG. 1 is a transmission path-time diagram of the operating and transmission conditions for a time hybrid in a concentrator and for a corresponding time hybrid in a subscriber station.

FIG. 2 is a block-schematic diagram of a time hybrid such as may be used both in a concentrator and in a subscriber station.

DETAILED DESCRIPTION OF THE DRAWINGS

The path-time diagram of FIG. 1 describes an instance in a PCM/TDM telecommunication network where the information blocks transmitted via the two-wire line comprise two PCM words each. Thus, the transmission cycle on the 2-wire line is 250 microseconds, assuming a PCM system having a 125 microsecond sampling pulse frame duration. This operation disclosed in the prior art (West German patent application No. P 23 46 984) enables the reduction of the bit signaling rate on the two-wire line and, thus, an economy of equalizing networks.

In addition, it is assumed that the information blocks comprise one start-of-block bit at the beginning, as well as a second bit for signaling so that, assuming 8-bit words, each block has a total of 18 bits. In the case of a two-wire circuit of 3 kilometers and 15 millisecond transit time per direction of transmission, there is obtained in this instance a minimum bit frequency of about 186 kilobits per second, if the 250 microsecond transmission cycle is fully utilized. The information block length is then 967 microseconds and the bit duration 5.37 microseconds.

As shown in FIG. 1, the send mode of the time hybrid allocated to the subscriber concentrator is initiated by a synchronizing pulse appearing at time slot Sy and produced in the subscriber concentrator.

The send mode of the time hybrids allocated to the subscriber stations is dependent on the acceptance of the data transmitted to it from the concentrator via the two-wire line. The start-of-block bit preceding these data serve to synchronize the time hybrids.

In both types of time hybrids a receive pause is observed between send mode and receive mode. As shown in FIG. 1 for the time hybrid allocated to the subscriber concentrator, this is the time interval PK between the send interval SK and the receive interval EK. In the case of the time hybrids allocated to the subscriber stations this is the interval PETL between the send interval STL and the receive interval ETL. The receive pause is measured such that, taking into consideration the maximum transit time to be expected on the two-wire lines, the receive mode will not start until an echo signal reflected back to the transmitting time hybrid by the end of block as a result of the acceptance in the other type of time hybrids, has already arrived again. Echo signals of this type are shown in FIG. 1 by the dashed line.

In the time hybrids allocated to the subscriber stations a send pause PSTL is observed between receive mode and subsequent send mode, and which at its beginning portions corresponds in time with the receive pause PK of the time hybrid in the subscriber concentrator. Thus, it is avoided that useful information issuing from neighboring subscriber station time hybrids reach the time hybrid in the subscriber concentrator during the received signal blocking condition, and as a result, cannot be rendered effective. Since the receive pause in the time hybrids in the subscriber concentrator is tuned to the maximum transit time to be expected, without this action this would occur in useful signals of all fairly short two-wire lines. In the case of the concentrator time hybrid the initiation of a send pause is not necessary, since the initiation of the send mode cannot take place prior to the occurrence of the synchronizing pulse.

With reference to the preferred embodiment described in FIG. 2, the basic structure of time hybrids in subscriber stations and of the time hybrid in the subscriber concentrator is the same.

The time hybrid of FIG. 2 has a receive shift register E and a send shift register S which are both designed to accept a 16 bit word and which are connected over a receive line branch LE or a send receive line branch LS to a transmission unit (not shown) which, in turn, is connected to a two-wire line.

The input of a start-of-block recognition unit BE is likewise connected to the receive branch LE. A central clock-pulse generator T produces a 2.048 Mbit/second clock pulse which, as shown in the figure by the short dashed lines, is applied to more than one unit of the hybrid, e.g., also to unit BE. In addition, this clock pulse is divided to the bit frequency which shall prevail on the two-wire line, by means of clock-pulse scaler TU. The transfer of the clock frequency to receive register E or to send register S, respectively, is shown by long dashed connections to these units.

The principal item of the time hybrid is a sequence control A comprising a number of counters, to wit: a send/receive counter Z controlling the information exchange with the two-wire line, a counter J controlling the internal information exchange either with an encoder/decoder, if the time hybrid is located in subscriber stations, or with the subscriber concentrator proper, as well as one or two pause counters serving to generate the send and receive pauses.

The pause counters, as well, are advanced with the aid of the clock frequency generated by the clock-pulse scaler TU.

If the start-of-block bit has been recognized by unit BE, this causes the send/receive counter Z to be reset to zero. At the same time, a switch K1 is driven to the conducting state so that shift register clock pulses can travel the bit frequency, to receive register E from clockpulse scaler TU, and this receive register is capable of accepting the information bit by bit from the branch LE. A total of 18 shift register clock pulses are generated, and with the appearance of the 18th shift register clock pulse the signaling bit is transmitted to a signaling unit SI. The send/receive counter which has then reached the counter reading $Z=18$, is now stopped. If the time hybrid is that of a subscriber concentrator, then the further counting of the send/receive counter time hybrid is caused by the occurrence of the synchronizing pulse generated in the concentrator. In subscriber station counters the pause counter producing the send pause, which has been advanced from its initial position when the counter reading $Z=18$ of the send/receive counter Z is reached, causes further stepping of the send/receive counter Z when its counter reading corresponding to the end of pause is reached.

In the case of the concentrator time hybrid the counter reading $Z=18$ of the send/receive counter may also be reached by free running, that is, in this type of time hybrid the send mode can also be initiated if no receive information has been received. Transmission from the time hybrid in a subscriber station occurs only if a unit of information has been received by the receive register E, and if the send pause immediately following the reception has lapsed.

If the above described transmission conditions are met, the send register S receives 18 shift register clock pulses from clock-pulse scaler TU over switch K2, which is conductive during counter readings $z=19$ to $Z=36$ of the send/receive counter, as a result of which an information block is sent to the branch LS and, thereby, finally to the two-wire line.

Concurrently with the initiation of the send mode, counter J of sequence control A is set to the zero condition. This counter J is advanced at a different clock rate than the send/receive counter, i.e., at the clock rate of the clock-pulse generator T divided by 8. To illustrate this, a dot-dashed trunk line is shown between clock-pulse scaler TU and the sequence control. During the counter reading $J=0$ and the counter reading $J=1$ of counter J the switches K3 and K4 are driven into the conducting state so that the 2,048 Mbit/second clock pulse can arrive as a shift register clock pulse over these switches to the receive register E or to an 8 bit transfer register ZR. In so doing, the information bits contained in the receive register E at the start of the send mode are read out and transferred to the intermediate register ZR, the first 8 bits being transferred immediately to the encoder/decoder unit of a subscriber station or to the concentrator, and the second 8 bits remaining in the transfer register ZR. Concurrently with the transfer of words to the encoder/decoder unit, an 8 bit word is transmitted from the latter to the send register S, for which the 2,048 Mbit clock pulse is applied to said register over the switch K5 triggered by the counter J of the sequence control.

After the elapse of 125 microseconds of this information exchange, after counter J has reached counter reading $J=33$, the 8 bit word buffered in the transfer register ZR is transmitted to the encoder/decoder unit of a subscriber station or to the concentrator. At the same time, a second 8 bit word travels to send register S from the encoder/decoder unit or from the concentrator. The send register S may also receive its information from a digit translator so that the selection code can be transmitted from the subscriber station to the concentrator, instead of the speech information.

The functional sequence described hereinabove is repeated henceforward.

The principles of the invention are described hereinabove by describing an exemplary and preferred embodiment constructed to operate according to those principles. It is contemplated that the described embodiment can be modified or changed in a variety of ways while remaining within the scope of the invention as defined by the appended claims.

We claim:

1. A method of transmitting digital data in a time division multiplex (TDM) telecommunication system between subscriber stations and a concentrator connected to said subscriber stations by means of two-wire lines operating on a four-wire basis, wherein said digital data is coupled through time hybrid circuits at said subscriber stations and through a time hybrid circuit at said concentrator, comprising the steps of:
    generating synchronizing pulses in said concentrator and communicating said synchronizing pulses to said concentrator time hybrid circuit,
    initiating a send mode in said concentrator time hybrid circuit responsive to a said synchronizing pulse,
    transmitting data signals from said concentrator to said subscriber stations,
    initiating a send mode in said subscriber station concentrators responsive to reception of said data signals and to a predetermined characteristic of said data signals,
    interposing receive pauses between each send mode and the subsequent receive mode in said concentrator time hybrid circuit and said subscriber station time hybrid circuits, each said receive pause having a duration equal to the maximum expected transit time for transmission over a said two-wire line between said concentrator and a said subscriber station, and
    producing send pauses in said subscriber station hybrid circuits and inserting them between receive modes and subsequent send modes, said send pauses ending, at the earliest, with the appearance of said receive pauses in said concentrator time hybrid circuit.

2. The method defined in claim 1 wherein said digital data is in the form of a block of data bits including a start bit and a signaling bit and wherein initiating of a send mode in said subscriber station time hybrid circuits is responsive to a start bit in a said block of data.

3. In a time division multiplex (TDM) telecommunication system for transmitting digital data signals wherein subscriber stations are connected to a concentrator associated therewith by two-wire lines operating on a four-wire basis, the transmitted digital data signals being coupled through time hybrid circuits at said subscriber stations and at said concentrator, said time hybrid circuits operating to have time-interleaved send and receive modes, the improvement comprising:
    means for generating synchronizing pulses in said concentrator and for transmitting said synchronizing pulses to said subscriber station time hybrid circuits,
    switching means for initiating send modes in said subscriber station hybrid circuits responsive to said synchronizing pulses, the said switching means in said subscriber station time hybrid circuits initiating send modes, as well, in dependence on the reception of data signals having a predetermined characteristic,
    said concentrator and said subscriber station hybrid circuits being constructed to interpose receive pauses between each send mode and a subsequent receive mode, said receive pauses being of a duration equal to the expected transit time for data signals on the two-wire lines connecting said concentrator to said subscriber stations,
    said subscriber station time hybrid circuits being further constructed to interpose send pauses which, at the earliest, end with the appearance of receive pauses in said concentrator time hybrid circuit.

* * * * *